United States Patent [19]

Morsbach et al.

[11] 3,929,342
[45] Dec. 30, 1975

[54] SPREADER SPRING FOR PISTON RINGS

[75] Inventors: Martin Morsbach, Hilgen; Paul Jöhren; Hermann Meuken, both of Burscheid, all of Germany

[73] Assignee: Goetzewerke, Burscheid, Germany

[22] Filed: June 13, 1975

[21] Appl. No.: 586,725

[30] Foreign Application Priority Data
June 22, 1974 Germany............................ 2430072

[52] U.S. Cl. ................. 277/141; 267/1.5; 277/220
[51] Int. Cl.² .......................................... F16J 9/06
[58] Field of Search ............ 267/1.5; 277/220, 221, 277/222, 139, 140, 141, 9.5, 11

[56] References Cited
UNITED STATES PATENTS

| | | | |
|---|---|---|---|
| 2,759,778 | 8/1956 | Anderson............................. | 277/220 |
| 2,851,317 | 9/1958 | Greifenstein........................ | 277/220 |
| 3,105,695 | 10/1963 | Burns et al.......................... | 277/141 |
| 3,261,612 | 7/1966 | Games................................. | 277/221 |
| 3,384,383 | 5/1968 | Wiemann et al.................... | 277/141 |
| 3,481,611 | 12/1969 | Stratton.............................. | 277/141 |

FOREIGN PATENTS OR APPLICATIONS

| | | | |
|---|---|---|---|
| 324,406 | 1/1930 | United Kingdom................. | 277/221 |
| 1,035,249 | 7/1966 | United Kingdom................. | 277/141 |
| 1,029,205 | 10/1958 | Germany............................ | 277/141 |

*Primary Examiner*—Robert I. Smith
*Attorney, Agent, or Firm*—Spencer & Kaye

[57] ABSTRACT

A spreader spring arranged in a circumferential piston groove for urging piston rings outwardly of the piston groove into engagement with a cylinder wall. The spreader spring is formed of a resilient strip bent annularly and having radially oriented corrugations and two adjoining spring strip ends. Each spring strip end has a cutout extending axially from a strip edge; the cutouts in the two strip ends are oriented, with their open side, in opposite axial directions. Each cutout has an axial dimension that is at least one half the width of the spring strip. The strip ends are oriented towards one another and are angularly bent at an angle of 0-90° with respect to the tangent of the annular spring strip in the location of bend, and further, the cutouts are disposed in the bent portions of the spring strip ends.

1 Claim, 3 Drawing Figures

SPREADER SPRING FOR PISTON RINGS

BACKGROUND OF THE INVENTION

This invention relates to a spreader spring for piston rings received in circumferential grooves of a piston. The spreader spring is of the type made of an annularly bent, resilient strip having radially oriented corrugations. Further, in the zone of the strip ends which are in an abutting relationship with respect to one another, there are provided axial cutouts which are oriented in oppostie directions and the axial depth of which is at least one-half the width of the strip. Further, the strip ends terminate in radially bent portions. It is noted that the terms "radial" and "axial" designate orientations relative to the piston axis.

For wiping off and controlling the lubricant film on the cylinder faces in piston-type internal combustion engines, there are provided lubricating ring structures which comprise one or more piston rings that are accommodated in the groove of the piston and wherein, between the piston ring and the base of the groove there is positioned a spreader spring which exerts a radial and/or axial force on the piston ring. To ensure a proper sealing effect of the piston ring, a sufficiently large freedom of motion is required between the inner circumferential face of the piston ring and the groove base. The same requirement is imposed on the spreader spring disposed between the piston ring and the groove base.

A spreader spring meeting the above requirement is known and is disclosed, for example, in German Accepted Published Pat. application (Auslegeschrift) No. 1,029,205. The spreader spring disclosed therein is formed of an annularly bent resilient strip having radially oriented meandering waves (corrugations) which are provided with axial shoulders in the zone of the inner circumference of the ring. These shoulders engage the piston rings which are made of a steel band and which are arranged on both sides of the spring corrugations. In this manner, the spring urges the piston rings radially outwardly against the cylinder. Since the spreading force of the spring is effected by virtue of decreasing its diameter during assembly, that is, the spring ends are situated on one another under tangential tension, a free radial mobility of spring and piston ring is ensured within the circumferential piston groove.

Spreader springs of the above outlined type have the disadvantage that upon assembly of the spring and/or the piston rings, the spring ends, because of the above-noted tangential tension, may easily snap into an expanded position which results in the loss of the spreading effect in the assembled condition. It is known from British Pat. No. 1,035,249 to provide axial openings in the vicinity of the spring ends which openings are oriented in opposite axial directions and have an axial depth that corresponds to one-half of the spring width. The openings are provided in the bent zone of the angularly bent, circumferentially backward extending divergent spring ends for the purpose of ensuring a mutual radial securing of the axially juxtapositioned spring strip ends in the zone of the openings. The precondition for an operative use of such a securing means is a permanent tension exerted on the ends of the spreader spring in the circumferential direction. Although such a tension will be present during the operation of the spring, it will be absent at the time of the assembling operation, particularly as the piston rings are passed over the spreader spring.

In U.S. Pat. No. 3,261,612 there is disclosed a permanent form-locking (positive) connection of the ends of the spreader spring. The solution taught in this patent, however, has the disadvantage that, during disassembly of the spreader spring, the spring ends can be disconnected from one another only by destruction.

In addition, there are numerous other structural solutions which require additional connecting components and thus are not satisfactory either from the economical or the technological point of view.

SUMMARY OF THE INVENTION

It is an object of the invention to provide an improved securing means at the ends of spreader springs of the above outlined type in order to ensure a secure, form-locking and disconnectable coupling of the two spring ends without the aid of separate connecting elements.

This object and others to become apparent as the specification progresses, are accomplished by the invention, according to which, briefly stated, the spring strip ends are bent at an angle between 0 and 90° with respect to a tangent and the openings are situated in the bent spring strip ends.

By means of the afore-outlined solution it is possible to manually hook to one another the spring strip ends externally of the circumferential piston groove, subsequent to the positioning of the spreader spring in the groove. Upon releasing the thus hookingly interconnected spring strip ends, the latter resiliently snap into the groove; by virtue of the axial restraining effect of the piston groove on the spring strip ends an accidental separation of the form-locking connection is impossible. A sudden radial release of the spring strip ends during the subsequent mounting of the piston rings is thus securely prevented. On the other hand, the spring ends may be separated from one another during disassembly by a simple unhooking step.

DESCRIPTION OF THE PREFERRED EMBODIMENT

Figure 1:
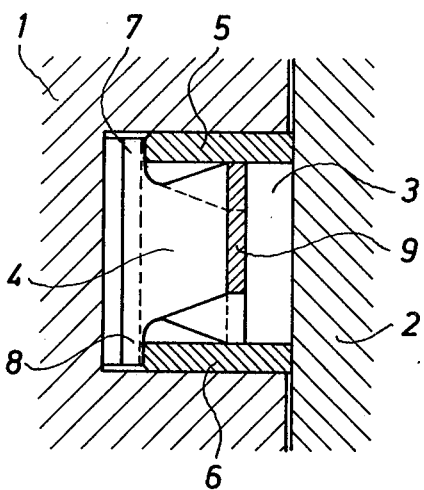
FIG. 1 is a fragmentary axial sectional view taken through a piston in the zone of a circumferential piston groove containing a wiper ring and spreader spring assembly.
Figure 2:
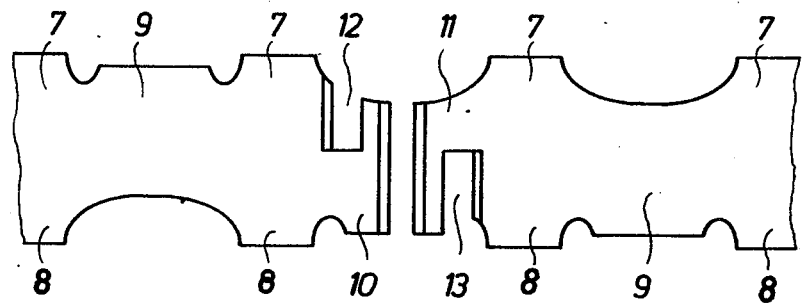
FIG. 2 is a fragmentary view, taken in a radial direction, of the end zones of the spreader spring in a position prior to mounting.
Figure 3:
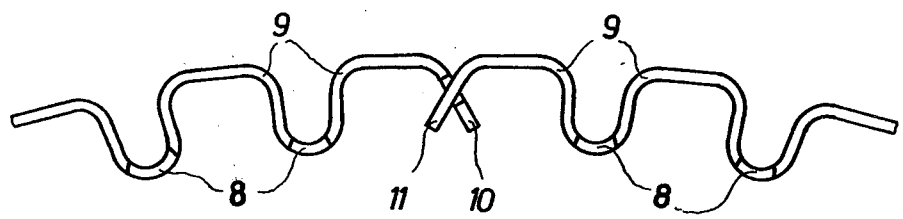
FIG. 3 is a fragmentary view, taken in an axial direction, of the end zones of the spreader spring subsequent to mounting.

Turning first to FIG. 1 there is shown, in a fragmentary manner, a piston 1 slidably arranged in a cylinder 2 of an internal combustion engine. In the piston 1 there is provided a circumferential groove 3 for receiving an annular spreader spring 4 which exerts a radially outwardly directed force towards the cylinder 2. The groove 3 further receives two piston rings 5 and 6 made of a steel band. The piston rings 5 and 6 are urged radially outwardly into a sealing relationship with the cylinder 2 by means of portions 7 and 8 of the spreader spring 4. The spreader spring 4 is made of a corrugated and annularly bent strip of spring steel, as it may be observed in FIGS. 2 and 3. The radial undulations 9 of the spreader spring 4 are designed in such a manner that they provide alternatingly a resilient, lateral (axial) support for the piston rings 5 and 6.

According to the invention, the end portions 10 and 11 of the spreader spring 4 are bent at an angle of approximately 60° to the tangent in a mutually convergent manner and are provided with cutouts 12 and 13, the open sides of which are oriented in opposite axial directions. The axial dimension (depth) of the openings equal one-half of the width of the spring strip. By virtue of this arrangement, the spreader spring ends 10 and 11 can be hooked to one another as it may be observed in the center of FIG. 3. The form-locking connection thus obtained may be exposed to tension or compression in the circumferential direction. Since the hooking and unhooking path of the spring ends 10 and 11 is oriented solely in the axial direction, and since any such axial motion is prevented by the walls of the groove in which the spreader spring is disposed, the above-described simple connection of the spring ends is perfectly secure.

It will be understood that the above description of the present invention is susceptible to various modifications, changes and adaptations, and the same are intended to be comprehended within the meaning and range of equivalents of the appended claim.

What is claimed is:

1. A spreader spring for disposition in a piston groove for urging piston rings outwardly of the piston groove into engagement with a cylinder wall; the spreader spring being formed of a resilient strip bent annularly and having radially oriented corrugations and two adjoining spring strip ends; each spring strip end has a cutout extending axially from a strip edge; the cutouts in the two strip ends being oriented, with their open side, in opposite axial directions; each cutout having an axial dimension that is at least one half the width of the spring strip; the improvement wherein said strip ends are oriented towards one another and are angularly bent at an angle of 0°–90° with respect to the tangent of the annular spring strip in the location of bend; said cutouts being disposed in the bent portions of said spring strip ends.

* * * * *